Figure 6:
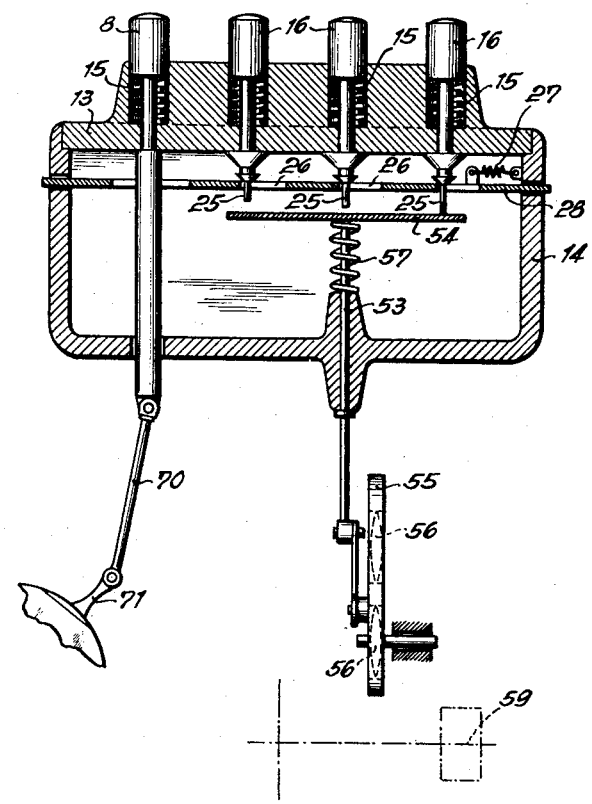

March 22, 1960 F. TRUM ET AL 2,929,307
ADJUSTING DEVICE FOR PHOTOGRAPHIC CAMERAS
Filed Jan. 6, 1955 7 Sheets-Sheet 1
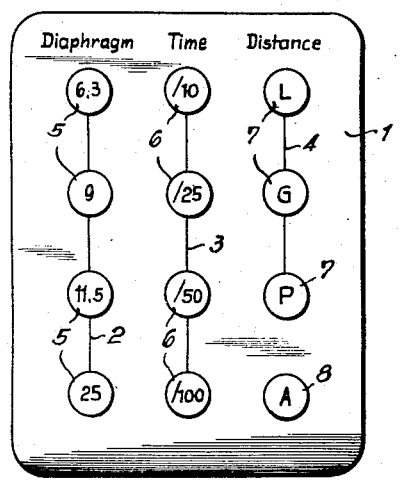
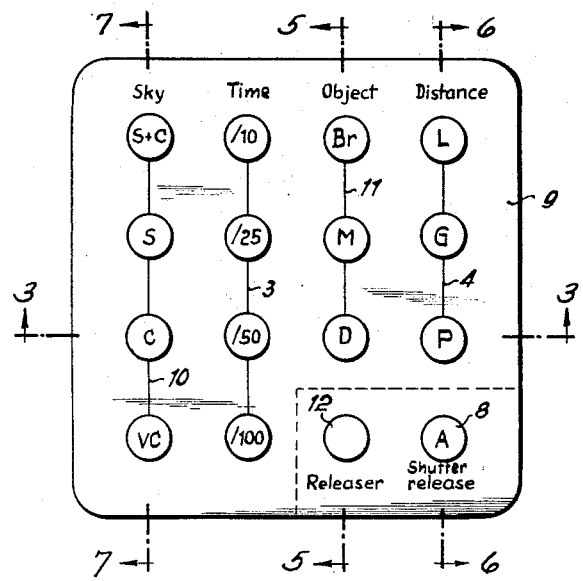
INVENTORS
FRANZ TRUM, WERNER SEIFERT AND
FRITZ FAULHABER
BY
ATTORNEYS

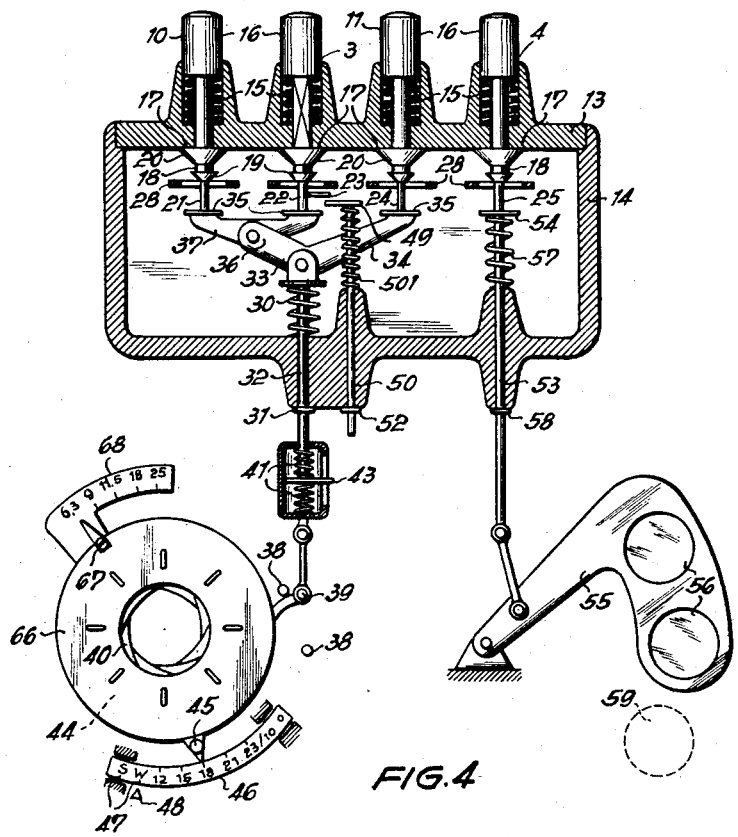
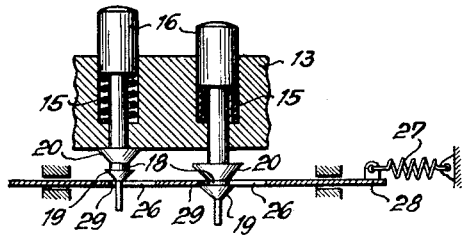

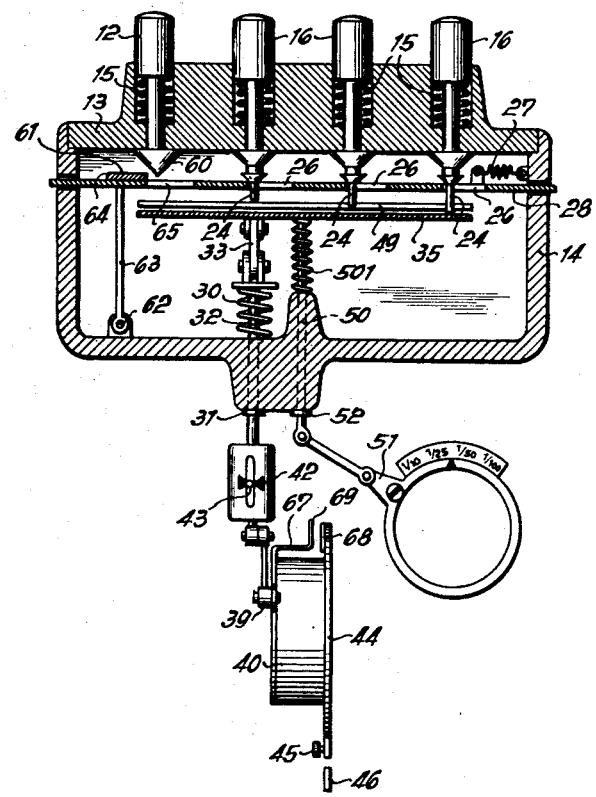

March 22, 1960 F. TRUM ET AL 2,929,307
ADJUSTING DEVICE FOR PHOTOGRAPHIC CAMERAS
Filed Jan. 6, 1955 7 Sheets-Sheet 4

INVENTORS
FRANZ TRUM, WERNER SEIFERT
AND FRITZ FAULHABER

BY Mock + Blum

ATTORNEYS

March 22, 1960  F. TRUM ET AL  2,929,307
ADJUSTING DEVICE FOR PHOTOGRAPHIC CAMERAS
Filed Jan. 6, 1955  7 Sheets-Sheet 5

*INVENTORS*
FRANZ TRUM, WERNER SEIFERT
AND FRITZ FAULHABER

BY Mock + Blum

ATTORNEYS

March 22, 1960  F. TRUM ET AL  2,929,307
ADJUSTING DEVICE FOR PHOTOGRAPHIC CAMERAS
Filed Jan. 6, 1955  7 Sheets-Sheet 6
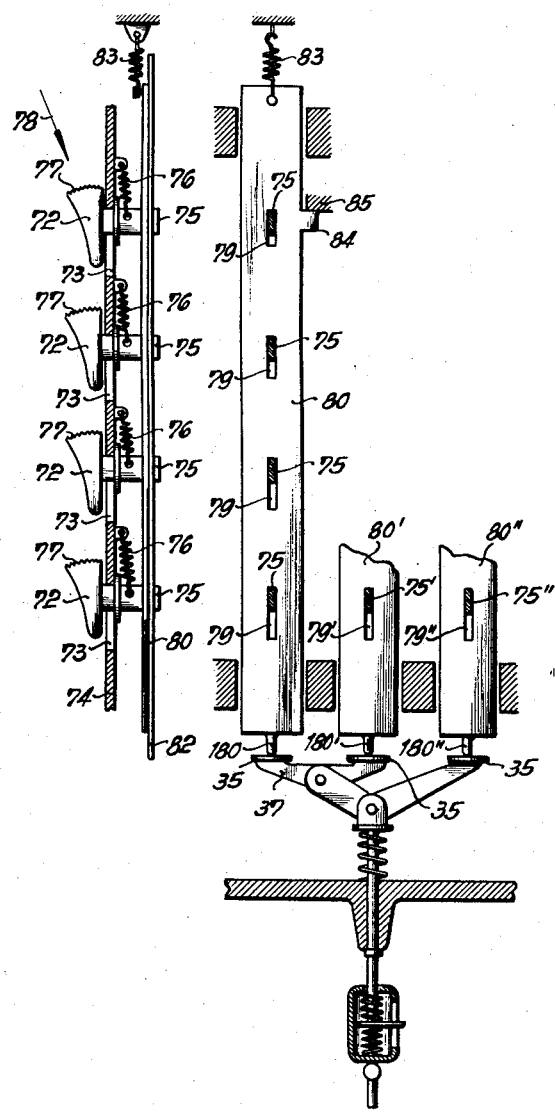
INVENTORS
FRANZ TRUM, WERNER SEIFERT
AND FRITZ FAULHABER
BY Mack + Blum
ATTORNEYS March 22, 1960     F. TRUM ET AL     2,929,307
ADJUSTING DEVICE FOR PHOTOGRAPHIC CAMERAS
Filed Jan. 6, 1955     7 Sheets-Sheet 7
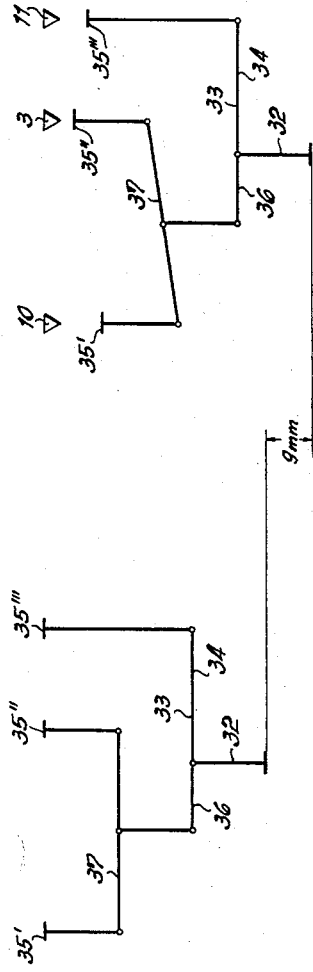
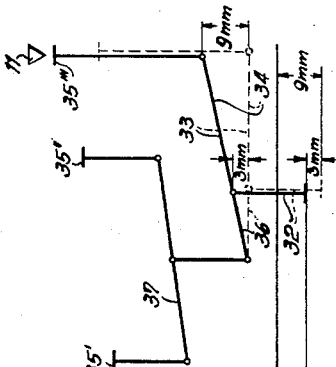
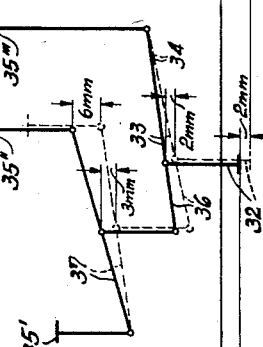
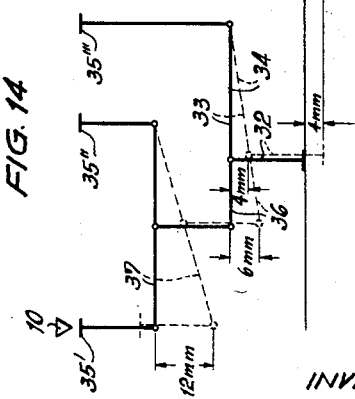
INVENTORS
FRANZ TRUM, WERNER SEIFERT
AND FRITZ FAULHABER
BY
ATTORNEYS United States Patent Office 2,929,307
Patented Mar. 22, 1960

2,929,307

ADJUSTING DEVICE FOR PHOTOGRAPHIC CAMERAS

Franz Trum and Werner Seifert, Braunschweig, and Fritz Faulhaber, Boblingen, Germany, assignors to Voigtlander A.G., Braunschweig, Germany, a corporation Application January 6, 1955, Serial No. 480,112

Claims priority, application Germany January 13, 1954

29 Claims. (Cl. 95—64)

In the various known devices for adjusting a photographic camera to the desired picture taking conditions, parts of these adjusting devices are either turned or displaced along a scale and are held in the desired position either by friction, or by notches or the like, or by clamping effect. Although this type of adjustment renders it possible to carry out a plurality of adjustments, it does not have the advantages of rapid adjustment.

The main object of the present invention consists in providing a photographic camera, for example a box camera, which requires only little subdivided adjustments, with adjusting organs, by which rapid and precise adjustment can be obtained and the operation of which is simple and not easily liable to error.

According to the present invention, for carrying out at least one of the camera adjustments necessary for taking a picture, the camera is provided with a group of push buttons or similarly acting members, each of which automatically locks itself upon its actuation and is under the effect of a return spring. Thereby, the number of push buttons in the respective group corresponds to the contemplated number of steps in the respective camera adjustment. Each push button, or the like, is mechanically connected, on the one hand, with the other push buttons of the same group and, on the other hand, with the camera adjustment member which belongs to this group and is under the effect of a return spring. Upon pressing down a selected push button of the group, every other push button of this group, which has been pressed down and locked up to then, is positively released and snaps out, while the newly depressed push button effects the corresponding camera adjustment.

Adjusting devices of this type are clear to the eye and at once understandable so that they offer a particular stimulus for their use. It is within the scope of the invention to adapt the number of push button groups, as well as the number of push buttons or the like in a single group, to the special requirements in each case.

It is preferred to use for the adjustment of the diaphragm, as well as for the adjustment of time and distance, one push button group each.

In order to facilitate evaluation in selecting the diaphragm, according to the invention, instead of a "diaphragm group," a separate additional push button group is used for consideration of the brightness of the sky as well as for the brightness of the object. Thereby a calculating mechanism, for example a calculating adding mechanism is provided, which is influenced by operation of the push buttons of the two before mentioned groups for consideration of the brightness of the sky and of the object, as well as by the group for adjustment of the shutter times and which transmits the displacement value resulting from the adjusting values to the member for adjusting the diaphragm.

In order to protect from damage the diaphragm adjusting member of the camera, which is movable between two stop elements, in the case of erroneous adjustment, an elastic member is built in at one point of the calculating mechanism. At said point, visible signs, or the like, can also be provided, which indicate an erroneous adjustment if such adjustment would result in an impracticable film exposure.

In order to avoid limitation of the keyboard and of the calculating mechanism to black and white photography and to include adjustments for flashlight and color pictures, an additional device can be be provided which allows switching of the keyboard and/or the calculating mechanism to exposure conditions for color films and for flashlight pictures.

It has been found convenient to carry out adjustments of other values which have an effect on exposure, such as sensitivity of the film and the season (summer and winter), on the diaphragm proper. In this connection it has been found to be of advantage to provide an adjustable second diaphragm ring, according to a further specific feature of the invention.

In the calculating mechanism provided in the camera, each push button of the group for adjustment of time is provided, if desired in addition to an extension acting on the calculating mechanism, with an additional extension, or the like, each of which adjusts, upon its being pressed down, the shutter of the camera, in conformity with the time value indicated on the respective buttton.

The individual push buttons of the group for adjusting the distance are likewise provided with an extension of such length, that, the camera member for adjustment of the distance, for example a displaceable objective, or a carrier for optical additional members, which is adapted to be inserted in the path of rays used in taking the picture, is adjustable to predetermined distance values.

The height of the adjusting keyboard can be substantially reduced according to another embodiment of the invention by substituting for the push buttons slides which are displaceably arranged in the camera wall, with equal strokes, against the effect of a return spring connected with each of the slides. Thereby the slides of each group engage with their flanges slots of an adjusting ledge, said slots having different lengths corresponding to the contemplated adjusting steps. Said adjusting ledge lies against a stop, which is stationary in the camera, under the effect of a return spring and the ledge is mechanically connected with the respective adjustable camera member, such as the diaphragm or an entrance member of the calculating mechanism. The slides of each group are, furthermore, mechanically connected with a locking ledge belonging to each of the groups, said locking ledge having the effect that each actuated slide is automatically locked in its end position and simultaneously, all of the other slides which have been locked up to then, are released.

The slides arranged in parallel position to the camera wall are provided with a preferably ribbed contact surface, so that the slides can be actuated by finger pressure exerted under an acute angle to the direction of the camera wall.

Other adjusting members of any desired construction, which are adapted to be used in the above described manner, can also be used instead of push buttons or keys, and slides.

In carrying out the desired camera adjustments, the adjusting handles can be provided with visible symbols, on the camera wall, near the handling members or on the handles proper. Furthermore the individual handling members of each group can be differently colored so that the color of each key or the like, visibly indicates the type of the respective adjustment. For example, the push buttons for setting the largest diaphragm, the longest shutter period and the infinite adjustment of the objective, can be provided with the brightest colors, while the push buttons corresponding to the respective smallest adjustment values, are colored in the darkest shades.

The appended drawings illustrate by way of example some embodiments of the invention to which the invention is not limited.

Figure 7:
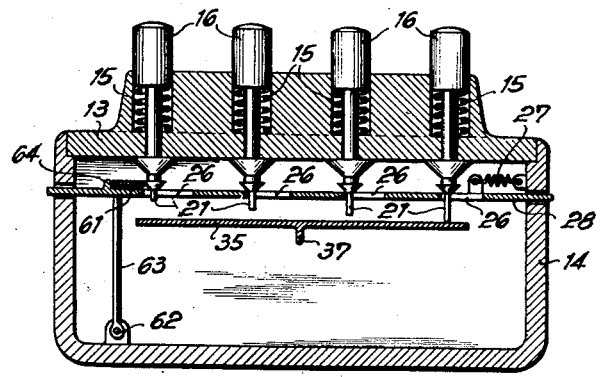
Figure 8:
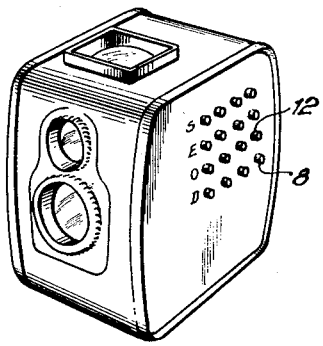

In the appended drawings, Figure 1 illustrates the push button keyboard of a camera for adjustment of the diaphragm, time, and distance, in top view; Figure 2 is a similar view of the push button keyboard of a camera, for adjustment of the brightness of sky and the object, to be estimated, as well as of the time and distance values; Figure 3 illustrates a section along line 3—3 through the push button keyboard shown in Figure 2, and diagrammatically illustrates also some of the camera parts actuated by said keyboard; Figure 4 shows a cross-section through two push buttons of a push button group, one of said buttons being in depressed and locked position; Figure 5 is a sectional view along line 5—5 of the push button keyboard shown in Figure 2 and diagrammatically illustrates some of the camera parts actuated by said keyboard; Figure 6 is a sectional view along line 6—6 of the push button keyboard shown in Figure 2 with the shutter release button shown on the opposite side of the casing and diagrammatically illustrates some of the camera parts actuated by said keyboard; Figure 7 is a section along line 7—7 of the push button keyboard shown in Figure 2; Figure 8 shows a box camera with a push-button keyboard provided on the side-wall of the camera, in perspective view; Figure 9 illustrates a slide group in longitudinal section; Figure 10 is the top view of the adjusting ledge engaged by the slides of each group, and Figure 11 shows in top view the locking ledge engaged by the slides of each group. Figs. 12–16 serve to diagrammatically illustrate the numerical example described hereinafter.

Referring now to the drawings in detail, the push button keyboard 1 shown in Figure 1, comprises three push button groups 2, 3 and 4, for the adjustment of the diaphragm, time and distance. The buttons for adjustment of diaphragm values and time values carry inscriptions of diaphragm values 5 and time values 6, respectively, to which the camera is supposed to be adjustable upon depressing each individual push button. Correspondingly, the push buttons for adjustment of distance, carry the initial letters of the indications "Landscape," "Group" and "Portrait," as shown at 7. The fourth button of push button group 4, is the normal release button 8, which is denoted A. Thus button A can be arranged also in another position than that shown in Figure 1, in which it is easier to find.

The push button system 9 shown in Figure 2 comprises, in addition to two push button groups 3 and 4, for the adjustment of time and distance, two additional push button groups 10 and 11, for the adjustment of the brightness of the sky and brightness of the object. Each of the push buttons of group 10 is provided with a specific symbol, for example S+C (corresponding to "Sun+Clouds"); S (corresponding to "Sun"); C (corresponds to "Cloudy"); and VC (corresponding to "Very Cloudy"). The push buttons for adjustment of the brightness of the object are provided with the symbol "Br" corresponding to "Bright"); "M" (corresponding to "Medium"); and "D" (corresponding to "Dark"). The fourth button in the row of push buttons for adjustment of the distance is the shutter release button 8 of the camera, which is arranged independently from the other push button systems, while the fourth button in the push button group for adjustment to the brightness of the object, is a release button 12, which, upon its operation, acts, if desired, on all buttons, or at least on the buttons acting on adjustment of the exposure of the camera and is supposed to put these buttons to their switching off position.

Figure 3 illustrates the sectional view along line 3—3 in Figure 2. In the upper wall 13 of a casing 14, push buttons 16, which are capable of being depressed and under the effect of return springs 15, are arranged. In their inactive position shown in Figure 3, these push buttons lie with their stop members 17 against the inner surface of upper wall 13. Each of these push buttons is provided on its lower portion with a rest recess 18 and below the latter with an inclined surface 19 and above the same with an additional inclined surface 20. In the embodiment shown, these inclined surfaces 19 and 20 form conical surfaces, whereby the cones 19 and the cones 20, respectively, have equal diameters. At their lower ends, the push buttons of the push button group 10, which serves for adjustment to the brightness of the sky, are provided with extensions 21; the push buttons of group 3 for time adjustment are provided with extensions 22 and 23; the push buttons of group 11 for adjustment to the brightness of the object are provided with extensions 24; and the push buttons of group 4 for adjustment of the distance are provided with extension 25. In order to keep the unilaterally arranged extensions 23 in their proper position, the longitudinally displaceable push buttons of group 3 are non-rotatable. As can be best seen in Figure 5, the extensions of the push buttons of each group pass through registering openings 26 of bars 28, each of which is displaceably arranged in casing 14 in the direction of the respective push button group, and is under the effect of a return spring 27.

In Figure 4, two push buttons 16 of one of the push button groups are shown in longitudinal section, one of said push buttons being in depressed, and simultaneously locked, position. When depressing one push button, locking is effected in such manner that upon movement of inclined surface 19 along edge 29 of opening 26 of the respective bar 28, the latter is pressed aside, whereupon the respective opening 26 by its edge 29, lockingly enters rest groove 18, which is arranged above inclined surface 19, in the push button.

Each of the inclined surfaces 20 provided above groove 18 on each push button, is arranged and dimensioned in such manner that, upon an additional depression of the push button beyond the locking position, surface 20 likewise cooperates with edge 29 of opening 26 of bar 28 and thereby brings about additional displacement of bar 28 in such manner that all other push buttons of the push button group, which have been, if desired, locked by bar 28 up to them, are released.

In the lower wall of casing 14 (see Figure 3) a rod 32 is arranged, which is under the effect of a spring 30, and lies in its rest position with a stop 31 against casing 14 and is displaceable below push button group 3 in the direction of the push buttons. On the portion located in the interior of casing 14, of the bar 32, a swinging double lever 33 is arranged. To the end of longer arm 34 of this double lever a ledge 35 is fastened which reaches with play under extensions 24 of push button group 11. The free end of short arm 36, the length of which is only ½ of the longer arm of double lever 33, carries a swinging double lever 37, the arms of which are of equal length, which, however, is likewise only ½ of the length of longer arm 34 of double lever 33. The free ends of each of the arms of double lever 37 are likewise provided with ledges 35. These ledges 35 reach with play under extensions 22 of push button group 3, as well as extensions 21 of push button group 10.

The arrangement of parts 32, 33 and 37 represents a calculating mechanism, i.e., a so called calculating adding mechanism, which has been known by itself in precision mechanics. Thereby, the strokes of the depressed push buttons are transmitted by their extensions over ledges 35 to the calculating adding mechanism. The latter adds these strokes with simultaneous reduction of the absolute amounts. Rod 32 transmits the resulting movement of the calculating adding mechanism to the diaphragm-adjusting member 39, which is movable between two stops 38, of diaphragm 40.

In actuating the selected adjusting buttons for consideration of the brightness of the sky and of the object to be taken, as well as the buttons for adjustment of the exposure time, the product thereof has to be transmitted to diaphragm-adjusting member 39, in order to obtain, with regard to this factor, a correct and uniform exposure of the film, in the picture to be taken after said adjustment. As is known, the amount of light, which yields a normal exposure of the film, is dependent, apart from a constant, on a series of factors which are in multiplicative connection, according to the equation:

$$L = H \cdot G \cdot B \cdot Z \cdot C$$

In this equation H stands for the brightness of the sky, G for the brightness of the object, B for the size of the diaphragm, Z for the time of exposure and C for a constant which depends on the sensitivity of the film. The necessary formation of the product of the individual values can take place by way of logarithms so that then only the sum of these values has to be formed. The calculating adding mechanism is capable of taking care of this job, because the extensions of the push buttons of each push button group are dimensioned or gradated with regard to their lengths according to the logarithmic value of the individual adjustments. In order to indicate a wrong adjustment, in which a correct exposure of the film cannot be attained and in which, therefore, the diaphragm adjusting member would be moved to bear against one of the stops 38 and, simultaneously, in order to avoid damage to the diaphragm-adjusting member, two pre-tensioned spring members 41 are inserted between rod 32 of the calculating adding mechanism and the diaphragm adjusting organ 39. Both parts 32 and 39 are provided with marks 42 and 43 (see Fig. 5) which, in view of changed conditions in spring members 41, do not coincide in the case of a wrong adjustment and become, therefore, conspicuous at once.

In addition to the above factors, sensitivity of the film used, as well as the different light conditions in summer and winter must be taken into consideration in order to bring about correct exposure of the film. This adjustment is rendered possible in the embodiment shown by providing diaphragm 40, in addition to its normal adjusting ring 66, with a second adjusting ring 44 (see Fig. 5), which is connected with the other ends of the diaphragm lamellae. Said ring 44 has a handle member 45, by which it can be adjusted relative to a scale 46 of the film sensitivity. Moreover, scale 46 has two indices 47 (S=summer and W=winter). For the preliminary adjustment of scale 46, one of said indices is set opposite to a mark 48 provided on the camera.

Extensions 23 of the push buttons of push button group 3, which serve for adjustment of time, are arranged in such manner that they act on a single organ 50 connected with the shutter time adjustment of the camera. Thereby, said organ 50 reaches with play under these extensions 23 by means of a ledge 49. It is movably arranged and guided in the direction of the push buttons. In their locked depressed positions, these extensions 23 transmit the amount of time marked on them, over said organ 50, to the shutter-time adjusting device 51 (see Figure 5) of the camera. Organ 50 too, is under the influence of a return spring 501, by the effect of which it lies against the lower wall of casing 14, by means of its stop member 52 in its rest position.

Figure 6 shows the sectional view of the push button keyboard along line 6—6 in Figure 2. It illustrates arrangement of the shutter release button within the keyboard and connection of the same with the shutter release means of the camera.

Furthermore, below push button group 4 for adjustment of distances, an adjusting member 53 is arranged, which is displaceably guided in the direction of the push button movement. Said member 53 reaches with play, by means of a ledge 54, under extensions 25 of the push buttons of this group 4. The adjusting member 53 is in the rest position shown under the effect of return spring 57 and thereby lies with its stop member 58 against the lower wall of casing 14. The lengths of the extensions 25 of the push buttons of this push button group 4 are selected in such manner that the push button having the shortest extension, upon its depression, does not cause displacement of a rocking member 55 arranged in the camera, while the next and the second next push button brings the first and second, respectively, supplementary optical lenses 56, held by rocking member 55 into the path of picture taking rays 59 of the camera (see Fig. 6).

Push button 12 (see Figures 2 and 5) for releasing push button groups 10, 3 and 11 (see Fig. 3) is likewise under the effect of a return spring 15 and is provided at its lower end with an inclined surface 60, which causes displacement, in the direction of guiding of bars or bolts 28, of a ledge 61, which is arranged transversely to bars 28 of push button groups 10, 3 and 11. In the embodiment shown, ledge 61 is arranged swingably about a pivot 62 in casing 14, on a rocking member 63 and is located in its rest position opposite to cams 64, which are arranged on each of the locking ledges of push button groups 10, 3 and 11. Thereby inclined surface 60 is dimensioned in such manner that, upon depressing push button 12, it causes displacement of ledge 61 and, thus over cams 64, of said bars 28 by such amount that thereby all push buttons of groups 10, 11 and 3, which have been depressed and held by the bars, up to this moment, are now released. Under the effect of their return springs 15, these push buttons pass to their switch off positions. Slide-like bar or bolt 28 pertaining to push button group 11, is provided below push button 12 with an opening 65 of such size that the latter allows free passage of the cone which forms inclined surface 60. Thereupon, for example in order to take flash-light or color pictures, to the exposure requirements of which the keyboard formed by push button groups 10, 3 and 11, is not adjusted, diaphragm 40 can be directly adjusted by means of a fastenable handle member 67, which is provided on diaphragm ring 66 (see Fig. 3). Thereby said member 67 passes with its pointer-like extension 69 a diaphragm scale 68 connected with the other diaphragm ring 44, whereby a wrong indication on scale 68 is avoided, in view of the adjustability of the second diaphragm ring.

Figure 7 shows particularly co-operation of extension 21 of push buttons 16 of push button group 10 for adjustment of the brightness of the sky, with ledge 35 of double lever 37.

In the box-camera shown in perspective view in Fig. 8, the push-button keyboard is arranged on the side-wall of the camera in such manner that the shutter release button 8 and relieving button 12 are near to the camera front wall.

The height of a keyboard according to the present invention can be kept particularly low by using slides instead of the push buttons. Figure 9, shows in longitudinal section and individual slide group of this type, as arranged within a total keyboard, for example, for consideration of the brightness of the sky or of the object to be photographed, of the time, or of the distance. The slides 72 of this group are displaceably arranged by means of their crosspieces 75 in longitudinal slots 73 of the camera wall 74, whereby said longitudinal slots have equal lengths. Each of the slides is under the effect of a return spring 76 which engages said crosspieces 75. The slides have corrugated contact surfaces 77, which are inclined in such manner that actuation of the slides can take place by operating pressure acting in an acute angle relative to the camera wall, in the direction of arrow 78. By means of members 75, the slides permeate through slots 79 (see Fig. 10) of an adjusting ledge 80 and through openings 81 of a ledge 82 (see Fig. 11).

Adjusting ledge 80, which is shown in Fig. 10 in top view and is movably guided in the direction of the slide group, is under the effect of a return spring 83 and lies in its rest position, by means of a cam 84, against stop 85, which is stationary in the camera. In the shown rest position of the adjustable ledge, crosspieces 75 touch one narrow side of the slots, which is behind them. The lengths of the slots are different and are determined by the adjustment value to be obtained by the respective slide. For example, crosspiece 75 which slides in the longest of the slots 79, carries out during its displacement also the largest idle stroke, before it takes along the adjusting ledge. Thus, the adjusting motion assigned to each slide, results, with consideration of the width of the crosspieces and an excess stroke to be explained further below, from the length of slots 73, with deduction of the idle stroke effective by the respective slot 79. Adjusting ledge 80 is connected over an extension 180 with an entrance member of the calculating mechanism. For example in the case of Fig. 10, this is ledge 35 of double lever 37. The structure of the calculating mechanism is here the same as in the device shown in Fig. 3 and described in detail in connection with Fig. 3. Reference numerals 80' and 80'' indicate the adjusting ledges of the adjacent groups, which act on their coordinated ledges 35 of the calculating mechanism, by means of their extensions 180' and 180''. If desired, an adjusting ledge can be connected directly, i.e. without insertion of a calculating mechanism, with the camera organ to be adjusted.

The locking ledge 82 shown in top view in Figure 11 extends likewise along the slide group. However, it is guided in inclined direction relative to said slide group and is under the effect of return springs 86. In the shown rest position of ledge 82, crosspieces 75 of slides 72, which permeate through openings 81 of ledge 82, touch the narrow side 87, as well as the long side 88 of the openings. Below cross-pieces 75, which are in rest position, on each of the long sides 88 of openings 81 an inward pointing saw tooth 89 is provided, the inclined flank 90 of said tooth being turned toward the crosspiece, which is in rest positon. The arrangement is all together tuned in such manner that, upon depressing one of the slides 72, the crosspiece 75 thereby displaced within the pertinent opening 81, owing to its start along inclined flank 90 of saw tooth 89, presses back the ledge 82 in the direction of its guides 91, whereby the respective saw tooth subsequently comes to lie with its locking edge 92 in front of the crosspiece and keeps the latter in locked position. This locked crosspiece 75 of the actuated slide should now be unlocked by actuation of any other slide. This is attained when the other slide, upon reaching its locked position, reaches stop 93 formed by the lower narrow side of openings 81, whereby ledge 82 carries out a slight excess stroke and is further pressed back to a certain extent, so that the first slide, which has been locked until then, is safely unlocked and is automatically brought to the initial position owing to the effect of spring 76.

The general principle of operation of the adjusting system according to the present invention, is further illustrated by the following numerical example which shows the manner of obtaining the resultant movement of the calculating adding mechanism for adjustment of the diaphragm.

This example relates to the calculating adding mechanism illustrated in Figure 3, which consists of parts 35, 37, 33 and 32 and is adjusted by actuation of push buttons 16. The three push button groups, i.e. 10 for consideration of the brightness of the sky, 3 for consideration of the exposure time and 11 for consideration of the brightness of the object, co-operate in the adjustment of the diaphragm.

By way of example, the following conditions are assumed for the beforementioned push button groups, and the following push button strokes are assumed for these conditions:

(a) Sky: Sun+clouds (push button stroke=12 mm.).
(b) Time of exposure: 1/50 sec. (push button stroke=6 mm.).
(c) Brightness of object: medium (push button stroke=9 mm.).

In order to demonstrate the adjustment values of the calculating adding mechanism in its various intermediate positions and with regard to the end result, Figures 12–16 diagrammatically illustrate the mechanism, the occurring adjustment values of the individual levers being shown in millimeters (mm.). In Figures 12 and 13, the reference numerals are in conformity with Figure 3, in order to explain the individual parts of the mechanism, while they are omitted in Figs. 14–16 for the sake of clarity.

Reference numerals 35', 35'' and 35''' denote the ledges, one of which extends under each of the various push button groups 10, 3 and 11. 37 denotes the double lever, the arms of which are of equal length, the free ends of this double lever carrying ledge 35' and 35'', respectively. Said double lever 37 is capable of swinging on the free end of short arm 36 of double lever 33, the longer arm 34 of which carries ledge 35''' on its free end. Double lever 33, the short arm of which has a length of ½ only of the longer arm, is swingably arranged on part 32, which is the member for transmitting the resulting movement of the calculating adding mechanism.

In Figure 13, the push button group coordinated to the individual ledges is indicated above each of the ledges.

Group 10 (sky) cooperates with ledge 35';
Group 3 (time) cooperates with ledge 35'';
Group 11 (object) cooperates with ledge 35'''.

Figure 12 shows the calculating adding mechanism in rest position, i.e. prior to any actuation, while Figure 13 illustrates its condition after actuation of the push buttons correlated with the picture taking conditions assumed above. It will be seen that rod 32 has been displaced by a total amount of 9 mm. Thus, in accordance with Figure 3, this stroke will act on adjusting member 39 of diaphragm 40.

Figures 14–16 demonstrate displacement of the calculating adding mechanism in accordance with the individual control steps. The full lines indicate the position of the individual elements prior to the actuation of the respective push button, while the broken lines—which have been drawn in slightly laterally displaced position for the sake of clarity—correspond to the position after the respective control steps.

If now the push button mentioned above under (a) of group 10 is actuated, it lowers ledge 35' by 12 mm. and thereby causes swinging of lever 37 in such manner that its pivoted point engaged by short arm 36 of double lever 33, is lowered by 6 mm. Thereby, the pivotal point of lever 33, which is formed by the upper end of rod 32, is also lowered by 4 mm. This amount is the result of adjustment by the first push button.

This first intermediate position of the mechanism is shown in Fig. 15. At this position, the push button of group 3, mentioned above under (b), is actuated, whereby ledge 35'' is lowered by 6 mm. and the pivotal point of lever 37 is lowered by an additional 3 mm. Transmission to rod 32, results in lowering the latter additionally by 2 mm.

Figure 16 shows this second intermediate position, which is now further changed by actuation of the push button mentioned above under (c).

Ledge 35''' is thereby additionally lowered by 9 mm., whereby rod 32 is lowered by an additional 3 mm.

Thus, the result of strokes acting on the calculating mechanism over the three push buttons, i.e.

|     | Mm. |
| --- | --- |
| (a) | 12  |
| (b) | 6   |
| (c) | 9   |
| Total | 27 | will be a resulting movement of 9 mm. total, for actuation of the diaphragm adjusting member.

What is claimed is:

1. A photographic camera provided with an adjustable diaphragm for the diaphragm opening, a member for adjusting said diaphragm, a device for adjustment of the diaphragm opening to the exposure factors, said device comprising a plurality of groups of individual handling members for the adjustment of each exposure factor by the handling members of an individual group, coordinated with the respective exposure factor, whereby each group of handling members controls a particular exposure factor and each such factor can be varied within itself by selectively manipulating any one of such group; said device also comprising a calculating mechanism having an exit member; means for locking in operative position individual handling members upon their actuation and means for unlocking every locked handling member of a group upon actuation of a handling member in said group for preventing simultaneous adjustment of an exposure factor by more than one handling member of a group; each handling member being provided with a spring for urging said member to its rest position; means for connecting the handling members with the calculating mechanism in order to cause adjustment of the calculating mechanism upon operation of any handling member of any of the groups, whereby the individual members of the same group cause adjustments of different size of the calculating mechanism; and means for connecting the exit member of the calculating mechanism with the adjusting member of the diaphragm in order to adjust the diaphragm in conformity with the movement of the exit member.

2. A photographic camera as claimed in claim 1, in which the handling members consist of push buttons.

3. A photographic camera as claimed in claim 1, in which the handling members consist of slides.

4. A photographic camera as claimed in claim 1, in which visible surfaces of handling members are provided with symbols for indicating the effect of the respective handling members.

5. A photographic camera as claimed in claim 1, in which the camera is of the box type, a shutter adjustable to various shutter times and a device for adjustment of the camera for taking pictures of objects at various distances, whereby an individual group of push buttons is provided for the distance adjustment.

6. A photographic camera as claimed in claim 1 in which said handling members comprise push buttons, said exposure factors comprise the brightness of the sky, the brightness of the object to be photographed, and the time, and said diaphragm adjusting member is movable between two stops.

7. A photographic camera as claimed in claim 6, the push buttons being provided with extensions, the length of which corresponds to the logarithmic figures of the individual values of brightness and time, assigned to the individual push buttons, so that upon actuation of each push button, the length of its extension is considered and transmitted to said calculating adding mechanism, which, in turn, acts on the diaphragm adjusting member of the camera.

8. A photographic camera as claimed in claim 6 in which the push buttons of each group are provided toward their lower ends with a rest groove acting transversely to the direction of their longitudinal extension and with one lower inclined surface arranged below, and a second, lower inclined surface arranged above said groove; slide-like bars provided with openings for the passage of said extensions of the push buttons therethrough; return springs biasing said bars against said extensions to engage an edge of said openings therewith.

9. A photographic camera as claimed in claim 8, in which the push button groups for adjustment of brightness of the sky, adjustment of the brightness of the object to be photographed and adjustment of the time, are arranged in three rows spaced at equal distances side by side and the calculating mechanism consists of a first double lever provided in the longitudinal direction of the middle row, swingably arranged on a displaceable rod which forms the exit member of said mechanism and is connected with the diaphragm adjusting member of the camera; said double lever having a long arm which reaches by means of a longitudinal ledge, under one of the adjacent push button groups; a second double lever having equal arms, being swingably arranged on the shorter arm of said first double lever; the arms of this second double lever being likewise shorter than the length of said long arm of the first double lever and reaching with play, by means of additional longitudinal ledges under the two other push button rows in such manner that they are influenced by the extensions of the actuated push buttons of said rows.

10. A photographic camera, as claimed in claim 9, comprising a return spring for acting on the diaphragm adjusting member of the camera and said displaceable rod which forms the exit member of the calculating mechanism and is connected with said adjusting member, in the switched off position of the push button groups, said spring forcing both members to a position determined by a stop, at which the diaphragm of the camera is either fully open, or most completely closed.

11. A photographic camera, as claimed in claim 10, comprising radially projecting extensions additionally provided on individual push buttons of the push button group for adjustment of time, said extensions being of such dimensions that upon actuation of each of these push buttons the time value assigned thereto is transmitted to the time-adjusting member of the camera shutter and the desired amount of time is adjusted.

12. A photographic camera, as claimed in claim 11, comprising a ledge, a spring and a stop, said spring pressing said ledge against said stop, said ledge being movably guided in the direction of the push buttons for adjustment of time, reaching freely with play under said push buttons and being mechanically connected over a rod with the time-adjusting member of the camera shutter.

13. A photographic camera as claimed in claim 12, comprising a ledge extending transversely relative to the bars of the push button groups, and cams adapted to be engaged by said ledge, a particular push button being provided at its lower end with a conical member, by means of which said push button is adapted to cause displacement of said ledge, said ledge being adapted to cause, by engagement of said cams, all bars to move to a position, in which the latter cause unlocking of all push buttons which have been locked until then.

14. A photographic camera, as claimed in claim 13, in which the push buttons of the push button group for adjustment of the distance are provided with extensions and a ledge, which is movably guided in the direction of the push buttons and is mechanically connected with a camera member for adjustment of the distance, and which reaches with play under said push buttons, whereby the lengths of said extensions are determined in such manner that their switching on results in movement of said camera member.

15. A photographic camera, as claimed in claim 14, in which the camera member for adjustment of the distance consists of a rocking member carrying at least two optical members, which are adapted to be selectively inserted by push button operation in the path of picture-taking rays and are tuned with the camera optics in such manner that the camera is capable of being adjusted to at least two distances.

16. A photographic camera, as claimed in claim 15, comprising a push button for shutter release, which is independent from the mutual locking of the adjusting push buttons of the push button system and is arranged as the last push button in the row of buttons for adjustment of the distance.

17. A photographic camera, as claimed in claim 16, comprising means for switching on a symbol of warning, if a selected combination of adjustments results in an impracticable picture-taking condition and for preventing damage to the diaphragm adjusting member which is movable between two stops.

18. A photographic camera as claimed in claim 17, wherein said means for switching on a symbol of warning comprises the displaceable rod serving as the exit member of the calculating mechanism, connected with the diaphragm adjusting member in both directions of movement with an insertion of two pretensioned springs, whereby said rod, as well as said member are provided with signs which coincide as long as said two springs are in the normal condition of equal tension.

19. A photographic camera, as claimed in claim 18, in which the diaphragm is provided with a first and a second diaphragm adjusting ring, said first ring being connected to the push buttons and provided with a diaphragm adjusting scale, and said second ring being provided with a fastenable, manually operable adjusting member, by which the diaphragm can be manually adjusted without use of the push buttons.

20. A photographic camera, as claimed in claim 19, in which the first diaphragm ring is likewise operable by a manually actuated handle, a scale in said camera, and a pointer extension adapted to pass over said scale.

21. A photographic camera, as claimed in claim 20, in which values of film sensitivity, to which the manually actuated handle can be set, are entered in the scale passed over by the pointer extension.

22. A photographic camera as claimed in claim 21, in which the scale with the pointer extension can be set to a zero position so that one of its two indices can be aligned with a stationary mark in the camera.

23. A photographic camera, as claimed in claim 1, comprising handling members consisting of slides, slots for guiding said slides along the camera wall, and return springs acting on each of said slides.

24. A photographic camera, as claimed in claim 23, in which the slides of each group are provided with crosspieces, adjusting ledges connected with a respective adjusting part of the camera, are provided with slots for permitting passage of said crosspieces; stationary stop elements and return springs for acting on said ledges which are guided in the direction of the slide motion and lie in rest position under the effect of said return springs against said stationary stop elements in the camera.

25. A photographic camera, as claimed in claim 24, in which the lengths of slots of the individual adjusting ledges differ from each other and are in conformity with the respective adjusting steps of the camera.

26. A photographic camera as claimed in claim 25, which comprises a locking ledge extending along the slide row of each slide group and being movable in inclined direction relative to said row, and a return spring for acting on said locking ledge; the cross-pieces of the slides in each group cooperating with said locking ledge.

27. A photographic camera, as claimed in claim 26, in which each locking ledge is provided with a saw tooth having an inclined surface and a locking edge, for cooperation with the respective crosspiece, said saw tooth being arranged in such manner that, upon actuation of a slide, the respective crosspiece presses back the locking ledge, by riding against an inclined surface of the saw tooth, whereby the locking ledge subsequently lockingly lies in front of the crosspiece, by means of a locking edge of the saw tooth.

28. A photographic camera, as claimed in claim 27, in which the locking ledge is additionally provided, for each crosspiece permeating it, with a stop arranged in such manner that the crosspiece of each slide, during its displacement, after pressing back of the locking ledge, by riding against the stop, further presses aside the locking ledge, so that all slides, which have been kept locked until then by the respective saw tooth are released.

29. A photogarphic camera, as claimed in claim 28, in which the slides are provided with a key surface ribbed in such manner that they can be actuated by finger pressure acting in an acute angle relative to the camera wall.

References Cited in the file of this patent
UNITED STATES PATENTS

| | | |
|---|---|---|
| 1,066,744 | McIntosh | July 8, 1913 |
| 2,009,145 | Nathan | July 23, 1935 |
| 2,179,822 | Imm | Nov. 14, 1939 |
| 2,295,949 | Holeka | Sept. 15, 1942 |
| 2,418,370 | Simmon | Apr. 1, 1947 |